May 13, 1969  B. A. MACKEY ET AL  3,443,459
DRILL
Filed Feb. 14, 1968  Sheet 1 of 4
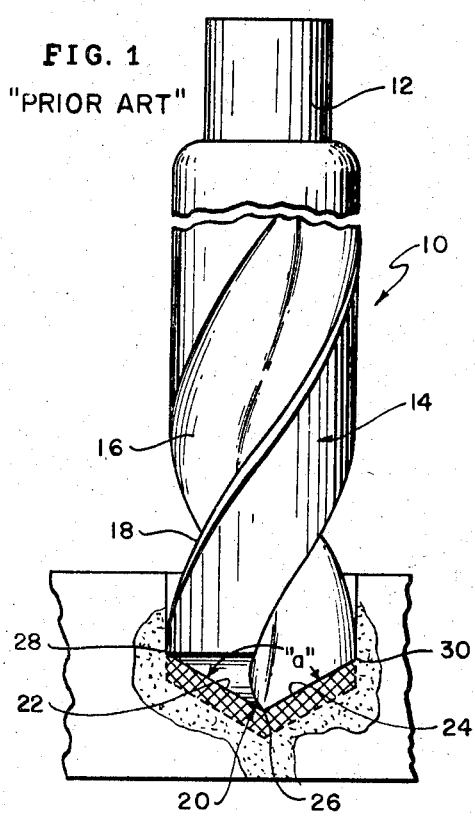
FIG. 1 "PRIOR ART"
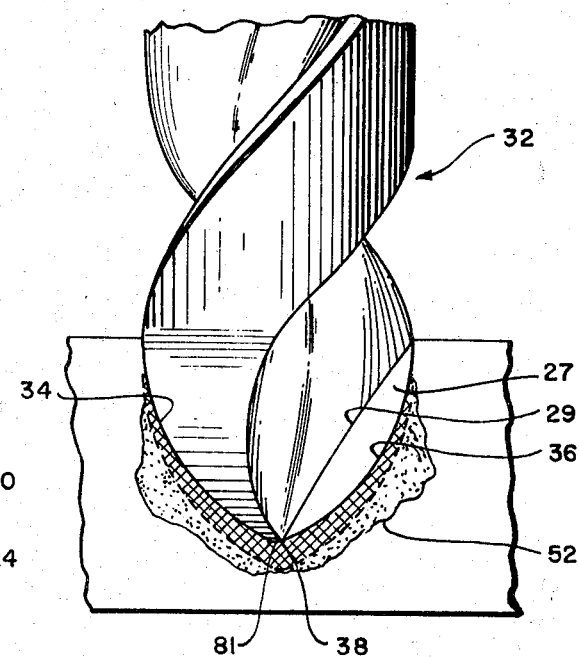
FIG. 2
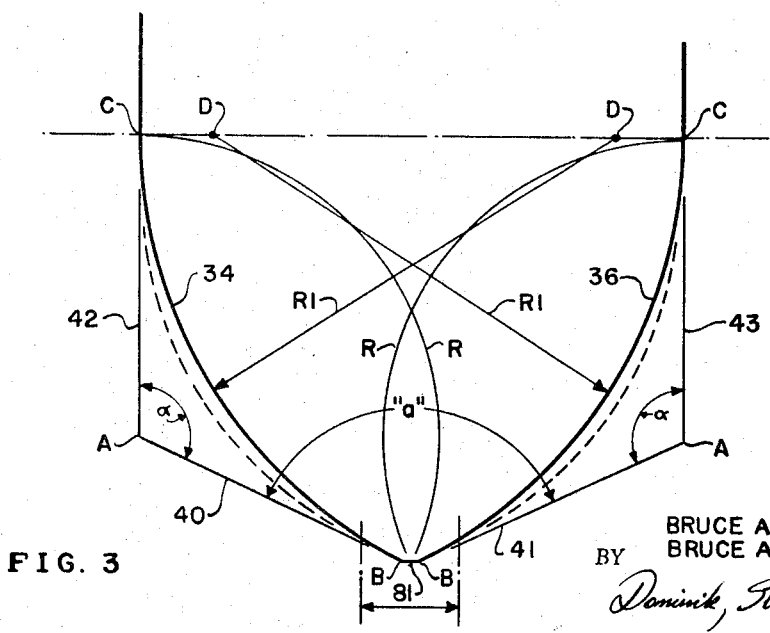
FIG. 3
INVENTOR.
BRUCE A. MACKEY
BRUCE A. MACKEY JR.
BY Dominik, Stein & Knechtel
ATTY'S.

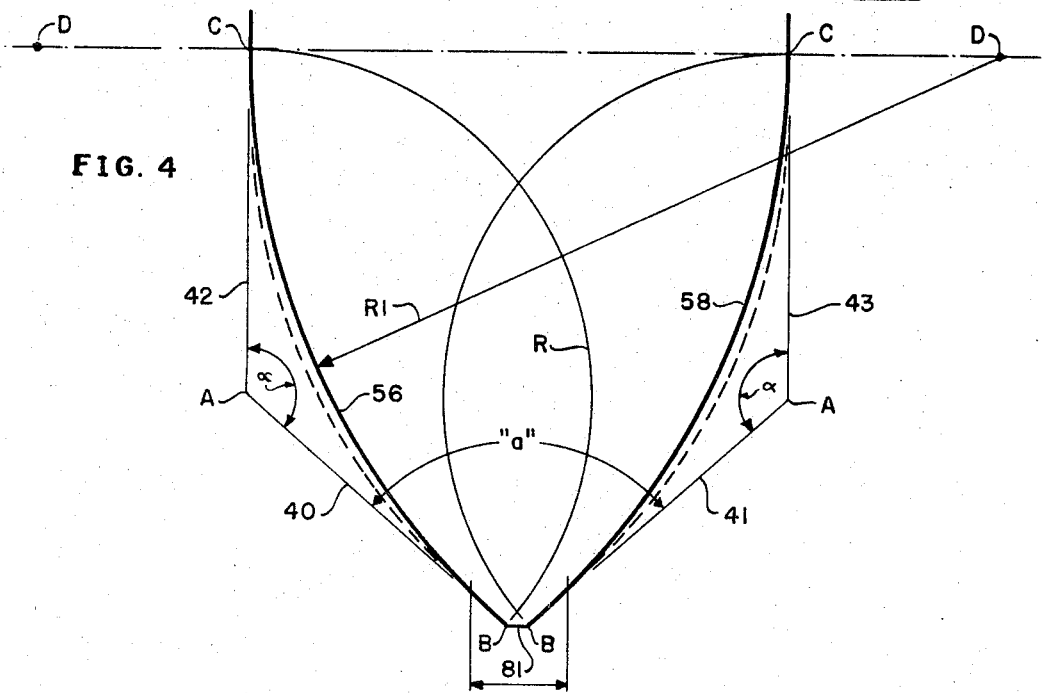
FIG. 4
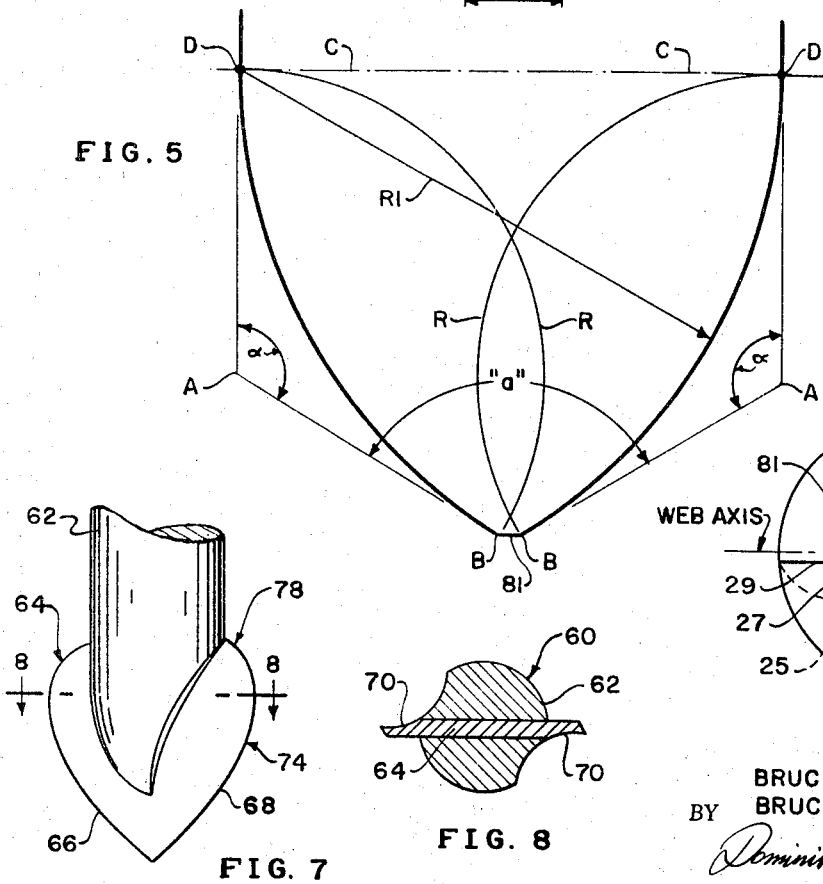
FIG. 5
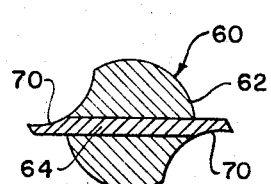
FIG. 7
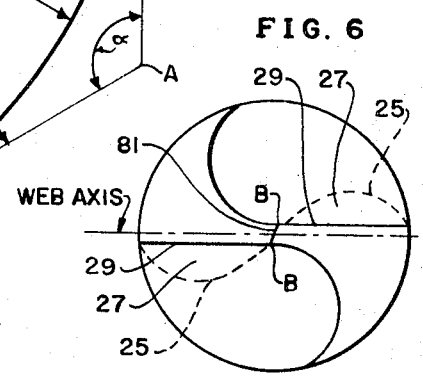
FIG. 8
FIG. 6
INVENTOR.
BRUCE A. MACKEY
BY BRUCE A. MACKEY JR.
ATTY'S.

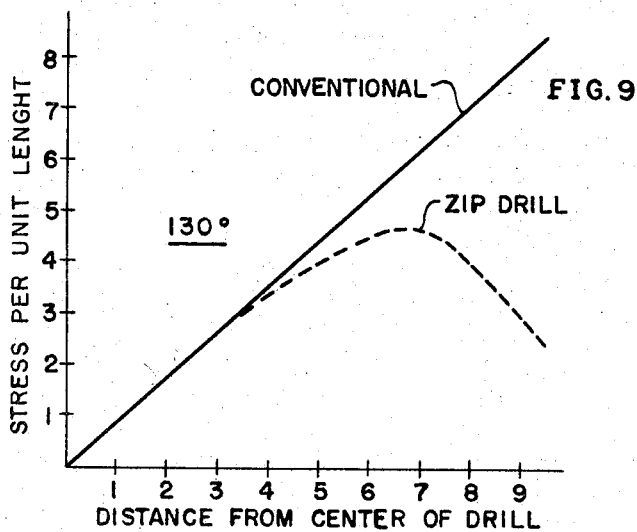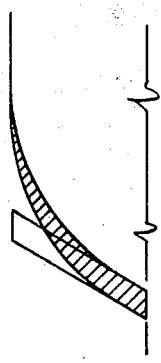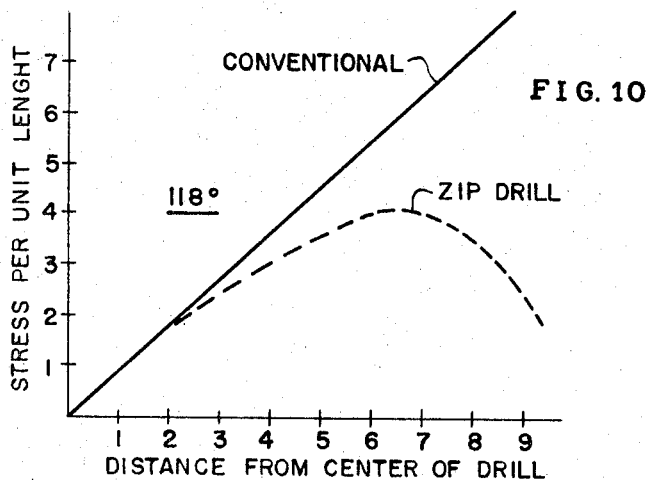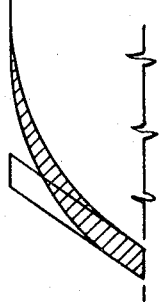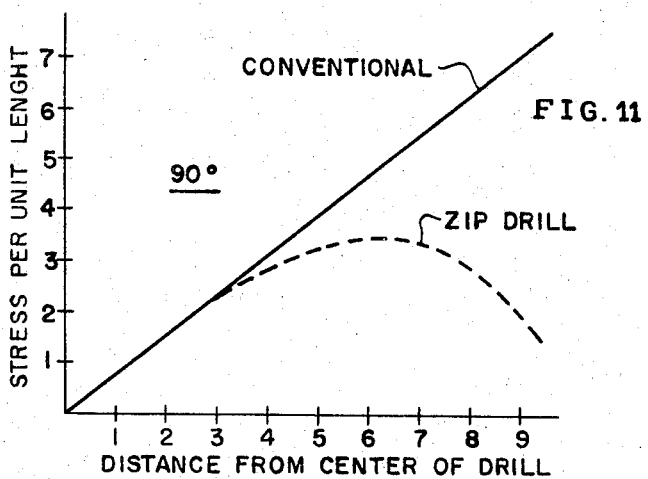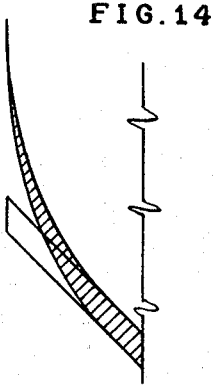

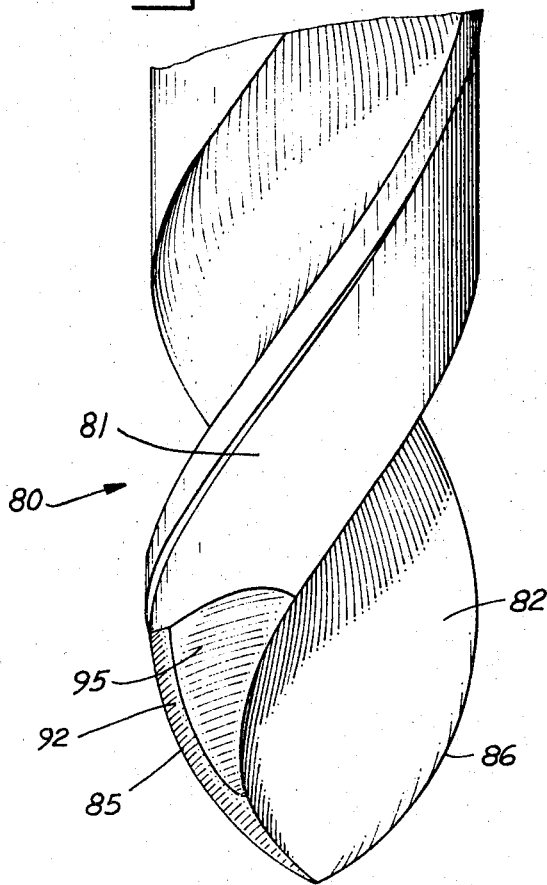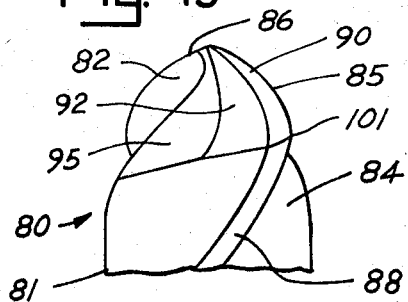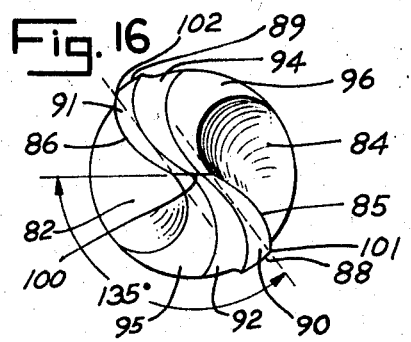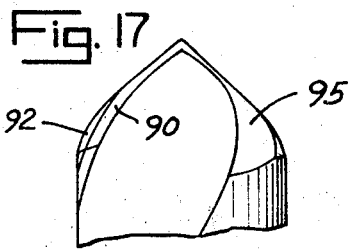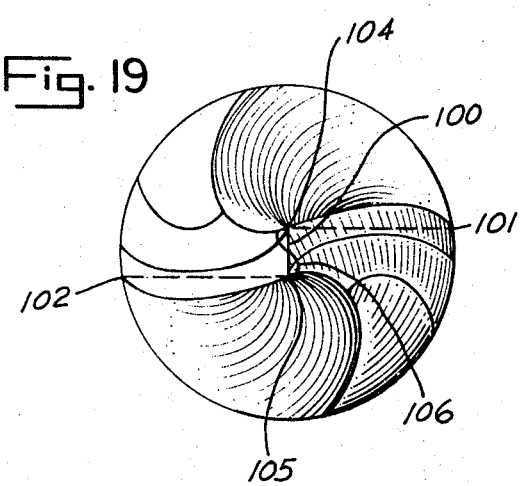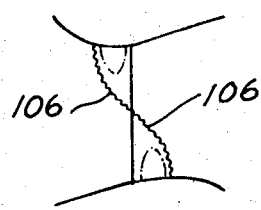
INVENTORS
BRUCE A. MACKEY
BRUCE A. MACKEY JR.
BY
Dominik, Stein & Knechtel
ATTY'S.

United States Patent Office 3,443,459
Patented May 13, 1969

3,443,459
DRILL
Bruce Alexander Mackey, 27 E. Park, Mundelein, Ill. 60060, and Bruce Alexander Mackey, Jr., Rte. 1, Box 25a, Libertyville, Ill. 60048
Continuation-in-part of application Ser. No. 637,820, May 11, 1967. This application Feb. 14, 1968, Ser. No. 714,393
Int. Cl. B23b 51/02, 51/00; B27g 15/00
U.S. Cl. 77—70                                    15 Claims

ABSTRACT OF THE DISCLOSURE

A drill having a cutting point with cutting lips which flow in a continuous curve and tangentially engage both the drill diameter and the straight cutting lips which normally are formed, at some predetermined included angle, on conventional drills.

---

A modification discloses a drill point with radial curvature coupled with secondary relief. In addition, the relationship between the chisel edge and the lead point of the cutting edge is disclosed as one of intersecting perpendicular planes.

This application is a continuation-in-part application of Ser. No. 595,279, filed Nov. 17, 1966; and Ser. No. 637,820, filed May 11, 1967, both now abandoned and naming Bruce A. Mackey and Bruce A. Mackey, Jr. as inventors.

This invention relates, in general, to drills and, in particular, to improvements in their point design to improve their cutting ability and to provide uniform wear distribution thereon.

The conventional two-fluted, commercial twist drill has a shank portion and a fluted body portion. The end of the fluted body portion forms the cutting point of the drill, and it is usually pointed and has angularly disposed straight cutting lips which join the drill diameter in a sharp point. The common practice is to change this entire point angle, to provide the best point angle for the particular material to be drilled. These point angles, generally referred to as the included angle of the cutting point, have been determined for most types of materials and have been tabulated for reference purposes.

While these tabulated included angles are generally accepted as the most efficient cutting point angles for drilling a particular material, there are, as explained in the above-mentioned copending applications, at least three principal objections to this type of point geometry; namely:

(1) The sharp points where the cutting lips join the drill diameter travel farther and faster than any other section of the cutting lips and remove more material. Accordingly, these sharp points are subject to greater wear. Consequently, these sharp points are more quickly dulled and therefore cause drilling to be impeded.

(2) At breakthrough, the greatest amount of material is left to be removed with the final revolution(s) of the drill so that greatly increased strain on the drill or else abrupt stoppage of the drill results. This is particularly true of the blunter points used to drill the hardest materials. This shock at breakthrough puts the greatest strain on the drill at its weakest points, the sharp points where the cutting lips join the drill diameter, so that breakdowns are frequent, and poor holes having rough edges result. In many cases, when the drill is actually stopped, and undue strain is placed on the equipment or, if the work piece is not securely clamped, the work piece is caused to pin around or to "corkscrew" up the drills, very often injuring the operator in the process.

(3) The sharp points where the cutting lips join the drill diameter also tend to score or make rough ridges on the sides of the holes so that the hole must thereafter be reamed to provide a smooth-sided hole. Accordingly, two separate operations are required to provide a smooth-sided hole.

Numerous attempts have been made to eliminate these objectionable features common to all presently available conventional twist drills, however, none of them have been successful. The problems plaguing the industry have been studied and several publications written on the findings have been published; for example, see: An Investigation of Twist Drills, Bruce W. Benedict and W. Penn Lukens, vol. XV, No. 13, University of Illinois, Urbana, 1917; An Investigation of Twist Drills, Part II, Bruce W. Benedict and Albert E. Hershey, vol. XXIV, No. 11, University of Illinois, Urbana, 1926.

Numerous United States patents also have been granted on improved drills. See, for example, U.S. Patent 1,309,-706; 1,887,374; 3,106,112; 3,199,381 and British Patent 2,674 (1904), to mention but a few of them. United States Patent 1,309,706, in particular, proposes to eliminate many of the above-mentioned objectionable features by giving to the cutting point of the drill a certain novel shape. This novel shape is clearly defined and, while not entirely different from the novel shape for the cutting point of the drill proposed by the present invention, it fails to provide a workable solution. For example, the curve defining the radius of the cutting lips has its center directly on the center line of the drill and has a radius greater than one half the diameter of the drill. This will not produce tangency of the cutting lips with the outer diameter of the drill which, as explained more fully below, is required to provide uniform load distribution and optimum cutting conditions on the outer diameter of the drill at breakthrough and during drilling of a hole. Furthermore, a conical grinding of the dead center area nearly tangent is required. The need for dead center penetration of the material being drilled is recognized, however, no recognition is given to the well-established fact that a particular included angle at dead center works better than another in specific materials. Accordingly, the drill, or more specifically, the disclosed drill cutting point, has never been accepted by the industry.

The above-mentioned copending applications disclosed an improved cutting point having curved cutting lips which were formed by gradually decreasing the included angle between the cutting lips so that they joined tangentially with the drill diameter. While this type of cutting point proved to be entirely satisfactory, for certain applications, it has been found that it can be further refined to provide still greater efficiency.

It is an object of the present invention to provide improved cutting points for drills, to improve the efficiency of the drills.

Another object is to provide improved cutting points having a configuration such as to re-distribute the stress on the cutting lips of the drill.

A still further object is to provide improved cutting points which like the presently available conventional drills are formed for particular materials, to provide the most efficient results with that material.

Still another object is to provide improved cutting points which can drill more holes before becoming dull than heretofore generally possible with conventional drills.

Still another object is to provide improved cutting points which produce a better quality hole so that the secondary reaming operation normally required is eliminated.

A still further object is to provide improved cutting points which are applicable to virtually all types of drills, such as twist drills, spade drills and the like.

Other objects of the invention will in part be obvious and will in part appear hereinafter.

The above objectives are accomplished with a drill having a cutting point with cutting lips which flow in a continuous curve and tangentially engage both the drill diameter and the straight cutting lips which normally are formed, at some predetermined included angle, on conventional drills.

A further modification which is disclosed relates to the provision of multiple relief faces dynamically trailing the drill cutting edge, and in addition, the relationship between the chisel point orientation and the cutting edge. Secondary, tertiary, and additional relief can be provided in combination with the radial relief disclosed.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a side plan view of a conventional twist drill;

FIG. 2 is a side plan view of a drill exemplary of the present invention;

FIGS. 3, 4 and 5 are views generally illustrating the manner in which the cutting points are formed on the drills of the present invention, said drills corresponding to conventional drills with 130°, 90° and 118° respectively included angle cutting lips;

FIG. 6 is an end view of the drill shown in FIG. 2;

FIG. 7 is a partial side plan view of a spade drill, having a cutting point exemplary of the invention;

FIG. 8 is an end plan view of the spade drill of FIG. 7;

FIGS. 9, 10 and 11 are graphs illustrating the stress distribution on the cutting point, from the center or axis of the drill to its diameter, for both conventional twist drills having 130°, 118° and 90° included angle cutting points, respectively, and for the corresponding drills of the present invention; and FIGS. 12, 13 and 14 are views illustrating the chip form for the same drills.

FIG. 15 is a side plan view of a drill exemplary of the present invention showing multiple relief behind the cutting edge.

FIG. 16 is an end view of the drill shown in FIG. 15.

FIG. 17 is a rear view of the drill point shown in FIG. 15.

FIG. 18 is a side elevation in enlarged scale of the drill point shown in FIGS. 15 through 17.

FIG. 19 is an end view of the drill shown in FIG. 18 illustrating the relationship between the chisel point and the cutting edge in a configuration differing from that shown in FIG. 16.

Similar reference characters refer to similar parts throughout the several views of the drawings.

Referring now to the drawings, in FIG. 1 there is shown a conventional twist drill 10 having a shank 12 and a fluted body 14 including two flutes 16 and 18. The fluted body 14 is terminated with a cutting point 20 having a pair of straight cutting lips 22 and 24 which angularly taper upwardly from a pointed tip 26 and join with the drill diameter in sharp points 28 and 30, respectively. The angle $a$ between the cutting lips 22 and 24 is the included angle of the drill's cutting point and, as indicated above, this included angle changes depending upon the particular material to be drilled, to provide the most efficient results. Generally, a greater included angle $a$ is used to drill hard materials, while less or more acute included angles are used for drilling softer materials.

A twist drill 32 having a cutting point 33 which is exemplary of the present invention is shown in FIG. 2. Generally, as indicated in the above-mentioned co-pending application, the cutting point 33 is formed by gradually decreasing the included angle $a$ normally provided on conventional twist drills so as to provide two cutting lips 34 and 36 which flow in a continuous regular curve from a pointed tip 38 and join with the drill diameter. With this construction, the wear on the cutting point 33 is redistributed over the length of the cutting lips 34 and 36. The above-mentioned objectionable features contributable to conventional twist drills are thereby substantially, if not completely, eliminated.

More specifically, the cutting point 33 of the twist drill 30 is formed as follows. The included angle $a$ normally provided between the straight cutting lips of a conventional twist drill, to most efficiently drill a particular material, is first determined. Referring to FIG. 3, in the illustrated example, the straight cutting lips are represented by the lines 40 and 41 (hereinafter referred to as cutting lips 40 and 41) and the included angle $a$ between them is assumed, for the purpose of explanation to be 130°. The cutting lips 40 and 41 intersect the drill diameter, represented by the lines 42 and 43 (hereinafter referred to as the drill diameter 42 and 43) in sharp points A.

Next, the angle $\alpha$ at the sharp point A, between the drill diameter 42 and the cutting lip 40, is bisected and a bisector line is drawn. A radius R, which is equal in length to the line AB (point B being at a point which is offset from the axis of the drill a distance equal to the displacement projection upon the web axis of one-half the distance between the remote ends of the chisel point 81, as viewed from the end of the drill, as generally illustrated in FIG. 6) is drawn, using the sharp point A as a center, to intersect the drill diameter 42, at a point C. A line is then drawn perpendicular to the drill diameter 42 and at the point C, so as to intersect the bisector line, at point D. A radius $R_1$ which is equal in length to the line CD is drawn, using point D as a center. The curved line CB forms the cutting lips 34, and it may be noted that it is tangent to both the drill diameter 42 and to the cutting lip 40 which would normally be provided on a conventional twist drill at the drill's cutting point 33, or point B. The cutting lip 36 of the twist drill 30 is formed in a like manner.

FIGS. 4 and 5 illustrate the manner in which the cutting lips 34 and 36 are formed on the drills of the present invention corresponding to conventional drills having cutting lips with included angles of 90° and 118°, respectively. In each case, the same procedure as set forth above is used.

It should be apparent from the above description that the cutting point of the drills of the present invention for use with a particular material is formed by, first, determining the included angle generally recommended and accepted as the most efficient cutting point on conventional twist drills for that material. Thereafter, the cutting lips are formed in a continuous curve to tangentially engage both the drill diameter and the straight cutting lip having the recommended included angle.

It may be noted that the cutting lips 34 and 36 of the twist drill 30 each have a circular configuration and further tangentially engage the cutting lip of a conventional twist drill, which cutting lip has a predetermined included angle, at the above-defined point B on the drill's cutting point 33. Improved efficiency is provided, in some cases, by having the cutting lips 34 and 36 tangentially engage the conventional straight cutting lips at a point some distance from the point B of the cutting point. In addition, or alternatively, the curvature of the cutting lips 34 and 36 can be ellipsoidal. In any case, however, regardless of the curvature of the cutting lips 34 and 36, at least a portion of the cutting lips must be formed along curved lines which tangentially engage both the drill diameters 42 and 43 and the conventional straight cutting lips, and for optimum results, the cutting lips should extend completely along these lines.

This may be better understood by referring to FIGS. 9, 10 and 11 which graphically illustrate the stress per unit length plotted against the distance from the center or axis of a drill, for both conventional twist drills and the drills of the present invention, having or predicated upon 130°, 118° and 90° included angle cutting points, respectively. All of the curves are uniformly loaded so comparisons can be made. With conventional twist drills, it can be seen that, in each case, the stress distribution on the cutting lips is greater, the farther the distance from the center or axis of the drill. The corresponding resulting stress distribution on a work piece is illustrated in FIG. 1, by the dotted area 50. It can be seen that there is a high stress concentration at the peripheral corner (at the sharp points 28 and 30) a relatively small build up intermediate the length of the cutting lips and a very high build up at the drill tip 26. For these reasons, as set forth above, conventional twist drills are objectionable.

With the twist drills of the present invention, it can be seen that the stress distribution on the cutting lips increases for some distance from the center or axis of the drill and then decreases as the drill diameter is approached. The corresponding resulting stress distribution on a work piece is illustrated in FIG. 2, by the dotted area 52. The stress at the critical peripheral corner, in this case, is substantially reduced. The stress is likewise substantially reduced at the drill tip 38. The stress is concentrated intermediate the length of the cutting lips, where it can be best handled by the drill.

FIGS. 12, 13 and 14 illustrate the actual chip form as expressed in displacement, for each of the drills of FIGS. 9, 10 and 11. The chip form for the conventional twist drills are shown in solid line, and it can be seen that, in each case, the area of the chip removed along the unit length of the cutting lips is substantially the same. This corresponds to the results which are expected, in viewing the stress distribution curves for these drills.

The chip form for the drills of the present invention are superimposed thereon, in a cross-hatched area. It can be seen that the area of chip removed along the length of the cutting lips decreases, from the center of the drill to its diameter. These results likewise are expected, after viewing the corresponding stress distribution curves.

By studying the stress distribution curve for any particular drill, the resulting chip form, the stress imposed upon a work piece (using a unique photographic technique) and the wear on the drill cutting point, the position of the stress and heat, and consequently wear, on the drill's cutting point can be controlled, by modifying the curvature of the cutting lips, to produce drills which are far more efficient than any drills heretofore available.

As indicated above, in many cases, improved efficiency is provided when the cutting lips 34 and 36 of the twist drill 32 tangentially engage the conventional straight cutting lips 40 and 41, at a spaced distance from the point B of the drill tip, as indicated by the dotted lines 56 and 58 in FIG. 3. The preferred spaced distance from the drill tip is within a range of 10–30 percent, and preferably within the range of 20–25 percent, of the drill's diameter. It may be noted that there is only a slight difference in the curvature of the two resulting cutting lips, however, this slight difference does, in fact, provide improved efficiency.

In forming the cutting lips 34 and 36, a rounded outer edge 25 results on each of them which is subject to damage during drill, due to breakage. An area 27 defined by the outer edge 25 and a line 29 therefore preferably is removed, so as to provide a flat support face (defined by the line 29) which substantially supports the cutting edge of the drill to prevent damage to the cutting lips. Substantially the same results can be provided, by changing the profile of the flutes.

Referring now to FIGS. 7 and 8, there is illustrated a drill 60 having an unfluted body 62 and a tip 64 of carbide, steel or other hardened material. Such drills are generally referred to as spade drills. The cutting lips 66 and 68 of the tip 64 are provided with a continuous curved configuration, in the same manner as a twist drill, such as the twist drill 32.

While the invention is described and shown applied only to twist drills and spade drills, it is to be understood that the described cutting point can be applied to other types of drills as well, whether they have round, square, fluted or otherwise shaped bodies.

The effectiveness of the spade drill 60, particularly when drilling materials that harden such as stainless steel, titanium and the like, or materials that soften, such as Lucite, when heated by a drilling action, can be further improved. This is accomplished by forming a small arcuate depression 70 along each of the cutting lips 66 and 68, extending from the point 72 up along the outer diameter of the drill. This provides a positive cutting or slicing action to the entire cutting lips of the drill, thus reducing heat generation and torque to an absolute minimum. It also provides a positive slicing action up the side of the drill a sufficient length, to the point designated by the numeral 74, to continue the cutting action at the time of breakthrough long enough to eliminate the possibility of strain or abrupt stoppage or corkscrewing.

The depression 70 is preferably further extended around the shoulder 78 of the tip 64, back to the drill body. This extension of the depression 70 is particularly essential when drilling certain plastic, such as nylon which contracts, so that it is necessary to ream the drill back out of the hole just drilled.

Accordingly, by forming the cutting lips on a drill in the above-defined manner, it is possible to re-distribute the stress on the cutting lips to combine drilling load per unit length of cutting lip from the outer diameter of the drill to its dead center area. By so re-distributing the stress, it is possible to control the point of highest stress to produce uniform wear across the entire cutting lips.

In current use, a drill will wear either at the point of the outer diameter or the point of dead center. The outer diameter point wear is a function of speed in r.p.m.'s and the dead center point wear is dependent on feed rate, or a combination of both speed and feed rate. By re-distributing the stress loads, it is possible to increase the speed without premature outer diameter failure, and by maintaining optimum feed rates for the particular material being drilled, the next result is a drill that will produce from 4 to 10 times as many holes and do it faster by a combination of speed increases and feed per revolution increases. Including proper coolants in the amount and location required will further increase the efficiency of the drill in the same relative magnitude, as it will in standard drills.

The cutting lips of the drill being tangent at the outer diameter of the drill has the effect of reaming a hole, as can be seen from the chip form cross-section which decreases at the outer diameter. The surface finish of a hole drilled with a standard drill tends to be rough because of the sharp points on the outer diameter of the drill gauge with each full cut. As breakthrough, a standard drill has a very large final pass to cut, whereas the drills of the present invention have a final pass which is extremely small. The resultant holes tend to have less burr and the tendency of the drill to catch and break or bind is all but eliminated. This feature is extremely important in materials which do not have the ability to withstand the thrust loads from the cutting lips as the point of the drill emerges from the work piece.

With the drill geometries as defined above, highly efficient results can be achieved in most drillable materials. With one inch thick plates of high manganese, high carbon "wear plate," a newly developed armour plate that could not heretofore be drilled, additional modifications to the cutting edge are required. Three inch diameter cylinders of stainless steel have been effectively drilled with the multiple relief drill point to be described hereinafter, as well as materials with a hardness as high as Rockwell 83.

The improved development stems from the discovery that mercator-like faces can be ground into the cutting face of a drill which provide progressive relief on the cutting face from the cutting edge. This effectively eliminates the "heel dragging," and consequent burning or dragging of a drill point achieved by that portion of the cutting face dynamically trailing the cutting edge. Secondary, tertiary, and additional relieved portions of the cuting face can be ground depending upon the size of the drill, the material being cut, and the drill variables, such as web thickness, flute shape, margins and the like.

Referring now to FIGURES 15 through 17, it will be seen that the twist drill 80 has the conventional fluted body 81 with opposed flutes 82, 84. The cutting lip 85, 86 extends on a radial curvature as defined in connection with the materials described relating to FIGURES 1 through 14. The outer terminus of the cutting edge effectively intersects the flute edge 88, 89 tangentially as described before.

The first face 90, 91 trails the cutting edge 85, 86 and is provided with the primary relief. The face 90, 91 is ground in accordance with the method and configuration as described regarding FIGURES 1 through 14.

Thereafter, however, the second face 92, 94 is ground with relief and arranged from 10° to 30° from the first face 90, 91. The amount of relief and included angle can be taken from ordinary handbooks as the cutting face relief generally desired for the material being ground, size of hole, at the intended rotation and feed rates. Examples of such handbooks are: Machining Data for Numerical Control, Air Force Machineability Data Center; Machinery Handbook, Industrial Press; Machining Data for Cold Finished Bars, Republic Steel Corporation; Machinist's Practical Guide, Morse Twist Drill & Machine Company; Tool and Engineers' Handbook, A.S.T.M.E.

An additional third face 95, 96 is ground desirably behind the second relief faces 92, 94. At this point it should be appreciated that the invention is directed to the provision of multiple relief faces of mercator-like appearance, and whether two, three, four or more are employed, is a function of the material being cut, the drill structure, and the conditions for cutting. Most desirable commercial embodiments in the average cutting ranges, however, will provide three or four mercator-like faces as disclosed in FIGURES 15 through 17. As a rule of thumb, three mercator-like faces are provided on standard twist drill shafts where the size is one-half inch or less. For sizes exceeding one-half inch, usually four mercator-like faces are ground.

In many applications the configuration shown in FIGURES 15 through 17 will be satisfactory, although it will be observed that the chisel edge 100 and the end of the cutting lip 101, 102 have an obtuse included angle. In some instances this will cause wobble, chatter, and holes being drilled out of round.

A significant departure from the accepted obtuse included angle relationship between the chisel edge and the end of the cutting lip is disclosed in FIGURE 19. There it will be seen that if parallel planes are drawn between the chisel edge ends 104, 105, these planes intersect the cutting lips' ends 101, 102. This relationship of perpendicularity or a 90° included angle between the chisel edge 100 and the ends of the cutting lip 101, 102 appears to be critical at 2°30′ for most materials. A deviation of plus or minus of 1°30′ appears to be most acceptable. If the angularity deviates beyond 2°30′ a chattering or torqueing will result in many materials, and the drill will either be out of round or oversize. In addition drill life is reduced. It further appears that this rule applies to drills regardless of web thickness and regardless of other manipulation of the central portion of the drill. The angular relationship does not appear to be affected by flute shape or helix angle. Furthermore, this perpendicular plane relationship applies as well to the drills shown in FIGURES 1 through 14 as those of FIGURES 15-19. However, this perpendicular plane rule does not apply to conventional pointed drills with straight cutting edges.

As explained regarding the drills shown and described in FIGURES 1-17, an effective tangential relationship of the termination of the cutting edge and the drill margin is desirable. It will be appreciated that if the cutting lip is tangent to the drill margin in profile, the same tangent relationship may not appear when viewed along the drill axis or converse. Furthermore, the intersection of the relieved mercator-like faces cannot, in all projections, be similarly tangent. Therefore, to preclude overgrinding beyond the point of tangency, all grinds are stopped at a positive tolerance to thereby preclude overgrinding.

Furthermore, the drill wear patterns and heat staining patterns are such as to indicate that a heat stain 106 as shown in FIGURE 19 will develop which is generally sinusodial in configuration, intersecting at the geometrical center of the chisel point 100, and trailing the cutting edge and extending into the face of the latter relief. This observation of a heat stain 106 is believed to confirm the theory that the amount of "heel dragging" of the relieved faces is substantially reduced, and that the area of plastic flow generated by the friction of the drill remains behind the last relieved face, and accordingly provides an area of softer plastic flowed material for the succeeding leading edge to engage, thereby serving to self-center the drill. Furthermore, by concentrating the plastic flow at the cutting point, and combining the radial configuration of the cutting lip for uniform loading through the balance of the shaving action of the drill, a self-centering action is dictated. It has further been observed that after the heat pattern has been established for the drill configuration and cutting conditions, bevelling the corner with additional relief where the stain would appear absent the bevel (see phantom lines in FIG. 20), will inhibit staining and improve drilling efficiency. With drills not having additional relief, the heat and plastic flow is oftentimes unevenly distributed over the entire perimeter of the trailing lip thereby producing wobble and unevenness of drilling. The results described above, however, are completely independent of any theory, and in the claims hereinafter set forth the structure is defined which will achieve the results.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A drill comprising an elongated body member having an axis of rotation about which the body rotates in a concentric circle with said axis and cutting lips formed on the end of said body member, at least a portion of said cutting lips each being defined by and formed along a continuous curve extending to tangentially engage and join both the periphery of the drill body member and a line defined by the included angle of the straight cutting lips normally formed on conventional drills for most efficient drilling.

2. The drill of claim 1, wherein said cutting lips each exend along the entire length of said continuous curve and join both the periphery of the drill body member and the lines defined by the included angle of the straight cutting lips normally formed on conventional drills for most efficient drilling.

3. The drill of claim 2, wherein said cutting lines each tangentially engage and join the line defined by the included angle of the straight cutting lips normally formed on conventional drills for most efficient drilling at a predetermined point displaced from the tip of the drill.

4. The drill of claim 2, wherein said cutting lines each tangentially engage and join the line defined by the included angle of the straight cutting lips normally formed on conventional drills for most efficient drilling at a point within a range of 10 to 30 percent of the drill's diameter from the axis of rotation of the drill.

5. The drill of claim 4, wherein said point is within a range of 20 to 25 percent of the drill's diameter.

6. The drill of claim 2, wherein said continuous curves defining said cutting lips are ellipsoidal curves.

7. The drill of claim 2, wherein said continuous curves defining said cutting lips each have a radius along a line drawn to bisect the included angle between the drill's diameter and the line defined by the straight cutting lip normally formed on conventional drills for most efficient drilling.

8. The drill of claim 2, wherein the resulting rounded outer edge of the cutting lips is removed so as to provide a flat support face which substantially supports the cutting edges of the drill to prevent damage to the cutting lips.

9. The drill of claim 2, wherein said cutting lips are formed on a tip of hard material affixed to said body member.

10. The drill of claim 9, wherein said tip has a depression therein extending inwardly along the length of each of said cutting lips from the point thereof to the points where said cutting lips join the outer periphery of the drill so as to form a positive cutting edge to said cutting lips.

11. A drill point having a cutting lip with multiple faced reliefs characterized by two or more mercator-like faces, each relief being relieved from its leading face by the same or greater relief, the first such face terminating at a chisel edge.

12. The drill of claim 11 in which the chisel edge is substantially a straight line.

13. The drill of claim 11 having lead cutting lips terminating at a straight line chisel edge, the outer ends of the lead cutting lips lying in parallel planes, the latter planes being perpendicular to the chisel edge ends.

14. The drill of claim 1 having a chisel edge which is substantially a straight line.

15. The drill of claim 1 having lead cutting lips terminating at a straight line chisel edge, the outer ends of the lead cutting lips lying in parallel planes, the latter planes being perpendicular to the chisel edge ends.

References Cited

UNITED STATES PATENTS 1,309,706   7/1919   Taylor _____ 77—70

FRANCIS S. HUSAR, *Primary Examiner.*

U.S. Cl. X.R.

145—117; 77—67